United States Patent [19]

Dewberry

[11] Patent Number: 4,532,688
[45] Date of Patent: Aug. 6, 1985

[54] METHOD AND APPARATUS FOR SERVICING FLUID METERS

[76] Inventor: James R. Dewberry, 1125 Wedgefield, Marietta, Ga. 30064

[21] Appl. No.: 504,617

[22] Filed: Jun. 15, 1983

[51] Int. Cl.³ .......................... F16L 55/18; F17D 3/00
[52] U.S. Cl. .................................. 29/402.08; 137/15; 137/316; 73/272 R
[58] Field of Search ................. 137/15, 316, 315, 317, 137/559, 231, 238; 285/12, 18, 30; 312/1; 73/274, 201, 262, 272, 273; 29/402.08, 157.3 A, 157.3 B, 157.3 C, 726, 727

[56] References Cited

U.S. PATENT DOCUMENTS

| | | | |
|---|---|---|---|
| 3,122,158 | 2/1964 | Grunsky | 137/317 X |
| 3,310,322 | 3/1967 | Carroll | 137/115 X |
| 3,615,159 | 10/1971 | Munoz | 137/15 |
| 3,946,754 | 3/1976 | Cook | 137/15 |
| 4,327,760 | 5/1982 | Lancaster | 137/15 |

Primary Examiner—Howard N. Goldberg
Assistant Examiner—Vernon K. Rising
Attorney, Agent, or Firm—Rodgers & Rodgers

[57] ABSTRACT

A fluid measuring device such as a gas meter may be disconnected from its associated inlet and outlet conduits and may either be replaced or serviced without replacement without interrupting service to a point of use by enclosing the meter to be replaced or serviced within an enclosing element which also encloses the inlet and outlet couplings and which is provided with a purge port and a translucent window together with access sleeves through its side wall whereby manual disconnection of the inlet and outlet couplings following initial loosening prior to employment of the enclosing element so as first to bleed entrapped air from the enclosing element and thereafter following closure of the purge port the meter to be serviced is manually removed and replaced by a meter disposed within the enclosing element. If circumstances permit, the meter to be serviced may be serviced within the enclosing element all without interrupting the flow of gas to the point of use. The enclosing element is secured in fluid tight relation about the meter and about the inlet and outlet conduits so as to form a fluid tight environment for disconnecting the meter to be serviced and for performing service operations thereon. If desired, the meter to be serviced may be replaced by a replacement meter disposed within the bag and in such manner as to maintain continuity of service.

14 Claims, 5 Drawing Figures

METHOD AND APPARATUS FOR SERVICING FLUID METERS

TECHNICAL FIELD

This invention relates primarily to a method and apparatus for servicing fluid meters such as are used to measure combustible gas and may also have application in conjunction with other apparatus including liquid systems.

BACKGROUND ART

Fluid meters such as gas meters must be serviced at periodic intervals. Such procedures normally require replacement of an in-service meter with a replacement meter or may involve procedures whereby a meter which is in service is serviced at its service location. In either event it is normally the practice to interrupt service and then to perform the service operations. Once such operations are completed service is reinstituted. Of course interruption of service in a gas installation shuts down all pilot lights and requires that such lights be reignited. In order to perform this complete operation, a serviceman must make a service call at a time when the owner of the residence being served is available so as to allow the serviceman access to the premises for reigniting extinguished pilot lights. This procedure is time consuming and sometimes many calls must be made by the serviceman before the occupant is available to allow access of the serviceman to the premises for the purpose of reigniting pilot lights.

In view of the above circumstance, many attempts have been made to enable a serviceman to perform all necessary service operations without interrupting customer service. These previous attempts have customarily taken the form of a bypass conduit with associated connectors or valves which are designed to allow the flow of gas around the meter connections during service operations. These prior practices are objectionable for a number of reasons. For example, they result in undesirable surges of gas and usually require substantial modification of the meter installation and of course are costly. Such practices are time consuming and in some instances facilitate fraudulent practices by making it possible for the customer to bypass the meter during normal operation thereof and thus facilitate appropriation of gas without proper compensation.

Examples of prior art practices may be found in U.S. Pat. No. 3,173,295 issued Mar. 16, 1965 for "Fluid By-pass Device" and in U.S. Pat. No. 3,187,570 issued June 8, 1965 for "By-pass For Fluid Meter".

DISCLOSURE OF THE INVENTION

According to this invention in one form, a fluid actuated device such as a gas meter having disjointable inlet and outlet conduits is surrounded by an enclosing element in such a way that couplings in the inlet and outlet conduits as well as the meter to be serviced are disposed within a fluid tight enclosure having a purge port which is opened following manual loosening of the inlet and outlet couplings for a sufficient period of time to purge atmospheric air from inside the enclosing element following which the purge port is closed and the meter to be serviced is completely disconnected by manually manipulating the couplings in the inlet and outlet conduits through access sleeves while an operator disposed outside the enclosure views the operations through a translucent window. Once the meter to be serviced is disconnected, service to the customer is maintained without interruption due to pressure of gas within the enclosing element so that a replacement meter previously placed within the enclosing element is then manually mounted in service position and the couplings in the inlet and outlet conduits are manually manipulated to finger tight condition. Thereafter the enclosing element is removed and the inlet and outlet couplings tightened by suitable tools. If desired, a meter to be serviced may be serviced while disposed within the enclosing element by conventional means through service test conduits extending into the enclosing element through fluid tight openings formed in a wall thereof.

BEST MODE OF CARRYING OUT THE INVENTION

Figure 1:
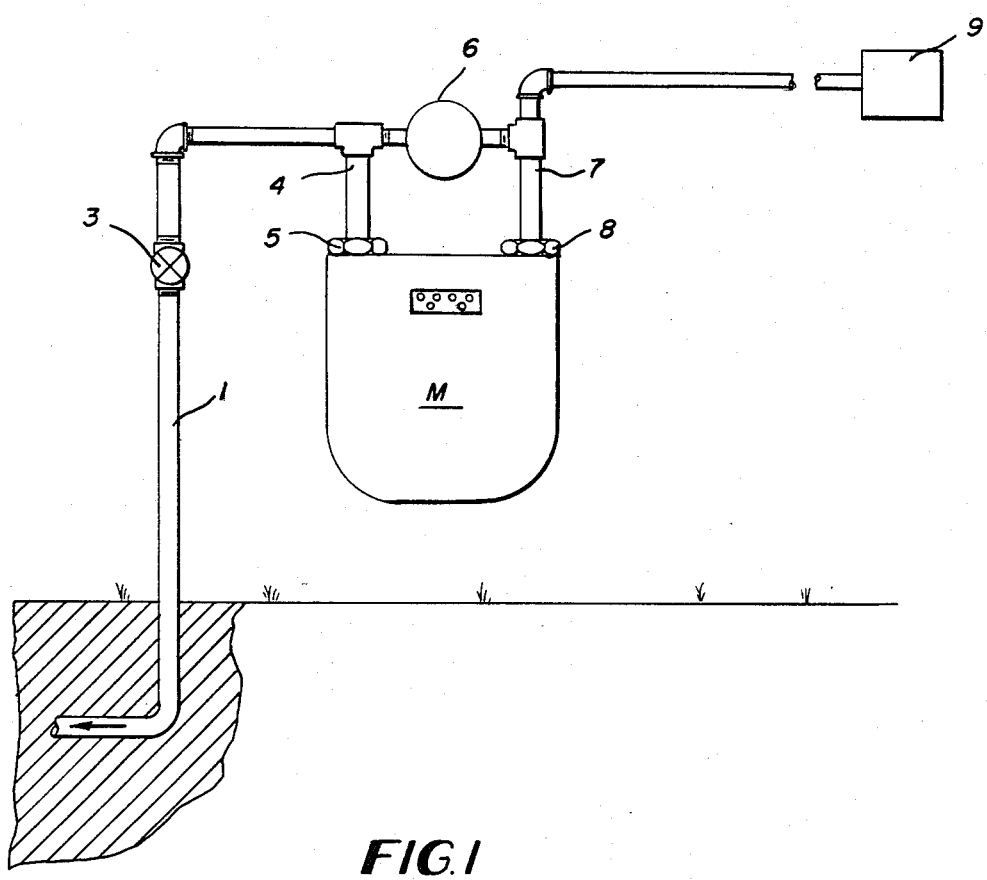
FIG. 1 is a side view of a conventional gas meter to which the method and apparatus of this invention are applicable.

With reference to FIG. 1, the meter to be serviced is designated at "M". A conduit 1 from a source of gas under pressure not shown in FIG. 1 is connected through a manually operable valve 3 and inlet conduit 4 to meter "M". Coupling 5 disjointably connects inlet conduit 4 with meter "M". Regulator 6 is arranged in conventional fashion and outlet conduit 7 is interconnected with meter "M" through coupling 8. Conduit 7 leads to a point of use schematically represented at 9 which could constitute a range, a water heater, a furnace or the like.

Figure 2:
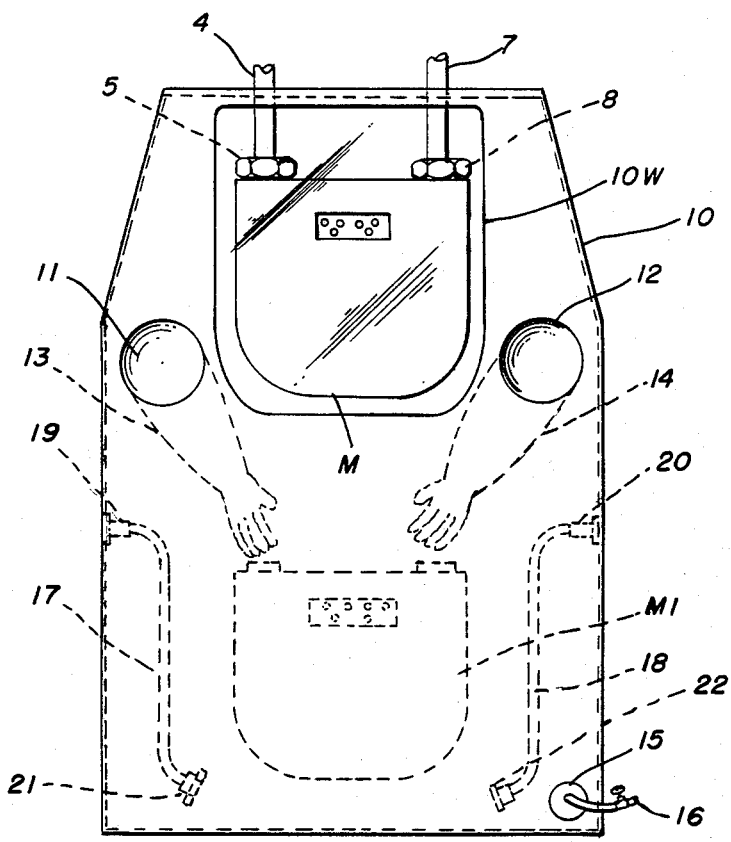
FIG. 2 is a schematic representation of an enclosing element such as a bag which is secured in fluid tight relation about a meter to be replaced and about the couplings which interconnect inlet and outlet conduits with the meter.

According to this invention and as is best shown in FIG. 2, an enclosing element or bag 10 is provided and preferably is formed of heavy duty material such as neoprene rubber or the like. As shown in FIG. 2 bag 10 surrounds meter "M" which is to be serviced or replaced and is secured in fluid tight relation about the inlet conduit 4 and the outlet conduit 7 so as to enclose the inlet coupling 5 and the outlet coupling 8.

For the purpose of performing service operations inside the bag 10, access means are provided and may take the form of a pair of access openings 11 and 12 which are formed in a wall of bag 10 and to which access sleeves 13 and 14 are interconnected in fluid tight relation. These access means constitute glove-like structures into which the hands and arms of an operator disposed outside the bag 10 may be inserted to perform service manipulations on the meter "M" to be replaced and on the replacement meter "M1". A purge port designated at 15 is provided and is equipped with a valve 16 whereby the purge port 15 may be opened or closed in a fluid tight manner. A viewing window of translucent material is formed in bag 10 and is designated at 10W to enable the operator to observe the manipulation inside the bag.

In order to perform a service operation, the serviceman first loosens the couplings 5 and 8 by a suitable tool to a finger tight condition so that subsequent loosening may be effected manually. Thereafter the replacement meter "M1" is placed inside the bag 10 along with replacement gaskets. The bag 10 with the meter M1 inside along with the new gaskets is then moved into the position represented in FIG. 2 with the bag forming a fluid tight enclosure about the two meters and which includes the couplings 5 and 8. Thereafter the purge fitting valve 16 is opened and the hands of the operator are inserted through the openings 11 and 12 and into the sleeves 13 and 14 respectively. Manual manipulation of the couplings 5 and 8 is then effected to a limited degree insufficient to allow a small amount of gas to escape into the bag 10. After a short time, perhaps 2 or 3 minutes, the bag 10 is filled with gas and atmospheric air originally disposed within the bag 10 is purged to atmosphere through the purge port 15 and valve 16. Thereafter the purge valve 16 is closed so as to maintain pressure within the bag 10 of approximately ¼th pound per square inch. This pressure is sufficient to maintain constant flow of gas from the inlet conduit 4 and out through the outlet conduit 7 even through the meter "M" is disconnected by manual manipulation of the couplings 5 and 8. Following manual disconnection of couplings 5 and 8, the meter to be serviced designated "M" is manually lowered into the bag 10 and the replacement meter "M1" is manually grasped and elevated to the position shown in FIG. 2 and designated at "M". With the meter in this position, the couplings 5 and 8 are manually manipulated to a finger tight condition. Thereafter the bag 10 is removed from its position about the meter and couplings 5 and 8 and the couplings 5 and 8 are then fully tightened by a suitable tool.

In some instances it is desirable simply to service the meter rather than to replace that meter. Such an operation is greatly faciliated by this invention because conventional service operations may be performed with the meter to be serviced disposed within the enclosing bag 10. Toward this end, test conduits 17 and 18 are disposed within the bag 10 and are secured at ports 19 and 20 in fluid tight relation to the wall of bag 10. Of course suitable test apparatus disposed outside bag 10 is interconnected at 19 and 20 with the test conduits 17 and 18 while the connectors 21 and 22 may be manually interconnected with the inlet and outlet conduits of the meter to be serviced. Thereafter conventional service operations are performed manually by an operator disposed outside the bag 10 and whose hands perform the necessary operations inside the bag 10 via the access sleeves 13 and 14.

Figure 3:
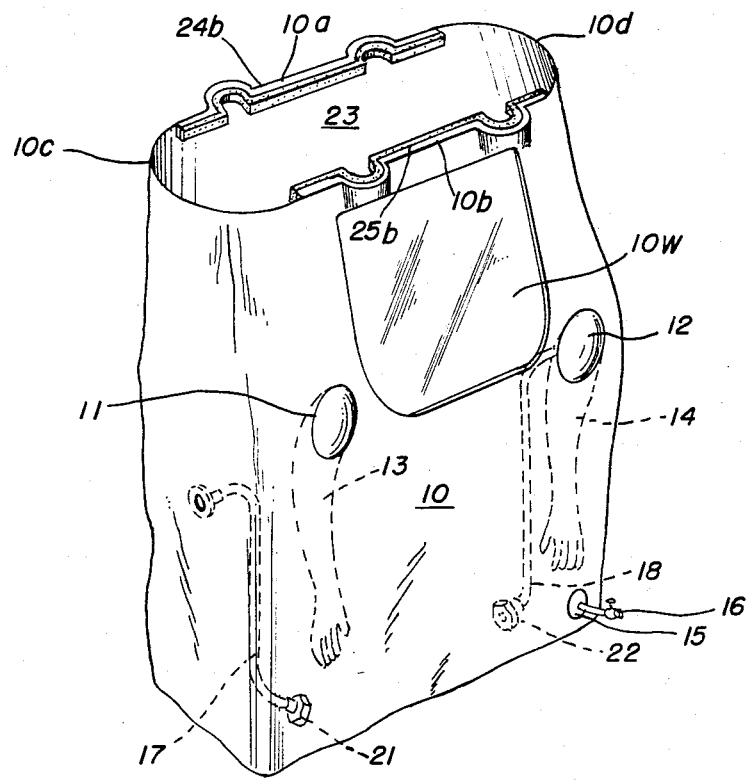
FIG. 3 is a schematic perspective view of an enclosing element formed according to this invention.
Figure 4:
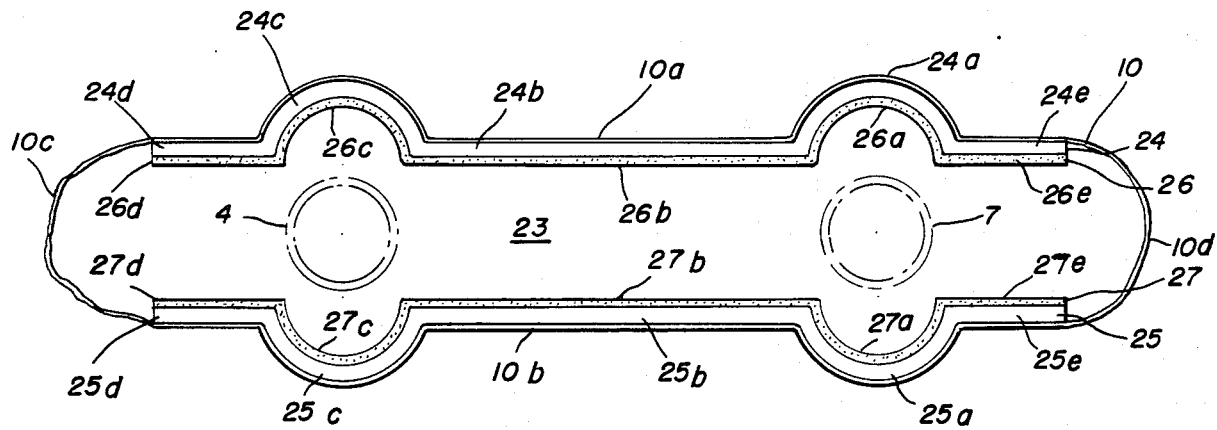
FIG. 4 is a plan view of bracket structure and associated gaskets which are formed according to this invention and which interrelate the bag and the meter to be serviced as well as the incoming and outgoing conduits in a fluid tight relation, and with the parts shown in the open or spaced apart condition.
Figure 5:
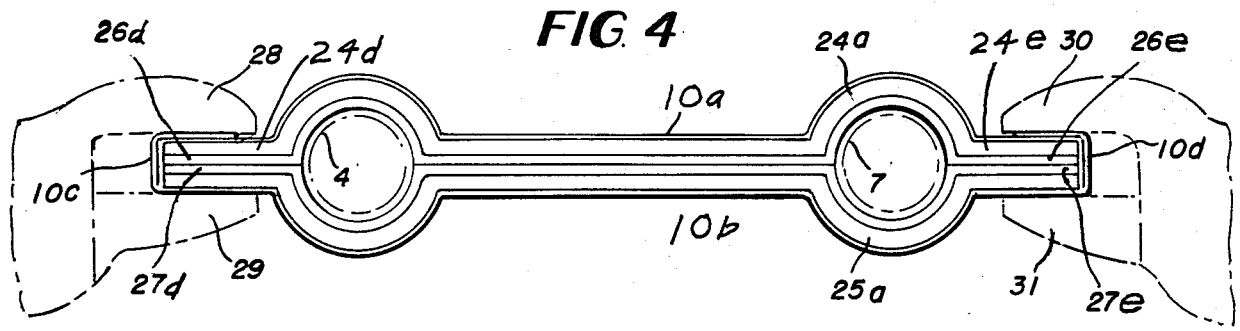
FIG. 5 is a view similar to FIG. 4 but which shows the bracket means and associated gasket means in the closed position whereby a fluid tight relation is established about the meter to be serviced and its incoming and outgoing conduits.

The bag 10 is secured in fluid tight relation about the meters "M" and "M1" and the couplings 5 and 8 by the structure best shown in FIGS. 3, 4, and 5. As is best shown in FIG. 3, an opening generally designated at 23 is formed in the upper end of bag 10 and a pair of bracket elements 24 and 25 are secured to the edges 10a and 10b of the bag 10 by any suitable adhesive or the like. Secured inside the bracket elements 24 and 25 are suitable gaskets 26 and 27. Bracket element 24 has an outwardly curved part 24a while bracket 25 has an outwardly curved portion 25a. Gasket 26 includes outwardly curved portion 26a while gasket 27 has outwardly bowed part 27a. As is apparent from FIGS. 4 and 5, the outwardly extending parts 24a and 25a of the brackets 24 and 25 together with the outwardly extending parts 26a and 27a of the gasket structures securely envelop the outlet conduit 7 as is best shown in FIG. 5. Of course this relationship is fluid tight. The inner flange portions of brackets 24 and 25 are designated 24b and 25b which together with flange portions 26b and 27b are securely gripped together so that the flange 26b of the gasket 26 is secured in flat face contacting relation with the flange 27b of gasket 27 to form a fluid tight connection between the edges 10a and 10b of bag 10. In like fashion the inlet conduit 4 is gripped in fluid tight fashion by the outwardly projecting gasket portions 26c and 27c together with the outwardly extending parts 24c and 25c of bracket elements 24 and 25. As explained, this gripping of inlet conduit 4 and outlet conduit 7 is disposed above the level of the couplings 5 and 8 respectively so that access to those couplings may be had manually via access sleeves 13 and 14 once the disconnecting operation begins.

From the description thus far it is apparent that the end portions 24d, 25d, 26d and 27d are securely gripped together as are the end portions 24e, 26e, 25e, and 27e. The portions 10c and 10d of bag 10 are collapsed on themselves and folded outwardly so as to lie in face contacting relation with the outer end portions 10a of bag 10 and with the outer surfaces of end portions 24d and 24e of bracket element 24 as shown in FIG. 5. It is obvious that the parts 10c and 10d could be folded to lie against 25d and 25e if desired. Such arrangement as shown in FIG. 5 is securely held in fluid tight relation with all the complementary parts by suitable manually operated clamping means schematically represented in FIG. 5 and having jaws 28 and 29 as well as 30 and 31. These clamping elements 28–31 can constitute parts of vice clamps which preferably are provided with over center toggle clamping means which are of conventional construction. Of course these vice like devices are similar to pliers in construction and thus may be manually mounted in the clamping positions as shown in FIG. 5 and which may readily be removed manually when the service operation is completed. If desired C-clamps or other known clamping means may be used.

INDUSTRIAL APPLICABILITY

This invention is of possible wide applicability due to the great number of fluid actuated devices such as gas meters which are in service and which require regular and periodic service attention. Of course the invention is particularly advantageous because it avoids interruption of service and does not require the service operator to make contact with the user of the service. Furthermore no modification of existing equipment or piping is necessary and the possible disadvantages which have characterized prior attempts to solve the problem of efficient servicing of gas meters are avoided. Furthermore the entire operation can be performed with a matter of a few minutes so that service time and expense are greatly reduced according to this invention.

I claim:
1. A method of interchanging a service meter having disjointable inlet and outlet couplings and arranged to measure the flow of fluid from a source of fluid under pressure to a point of use, the method comprising the steps of loosening said couplings sufficiently to accommodate manual manipulation thereof, placing a replacement meter within an enclosing element having a normally closed purge port, securing said enclosing element having said replacement meter therein about said service meter and about said inlet and said outlet couplings in substantially fluid tight relation therewith, opening said purge port, manually loosening at least one of said couplings slightly to cause fluid to bleed into said enclosing element at a rate such that flow of fluid to said point of use is not substantially reduced and such that air is purged from said enclosing element, closing said purge fitting, manually manipulating said couplings so as to disconnect said service meter, said enclosing element constituting the sole conduit of fluid between said inlet and said outlet couplings following disconnection of said service meter, manually manipulating said couplings so as to connect said replacement meter therewith in finger tight relation, removing said enclosing element from about said replacement meter and said inlet and outlet couplings, and fully tightening said inlet and said outlet couplings, said service meter being retained within said enclosing element until after disassociation of said enclosing element from said replacement meter and from said inlet and outlet couplings.

2. A method according to claim 1 wherein said enclosing element includes fluid tight access means and wherein said couplings and associated elements are operated manually by an operator from outside said enclosing structure via said fluid tight access means, said service meter being disconnected manually only after the pressure within said enclosing element is sufficiently high to maintain an adequate rate of flow of fluid to said point of use.

3. In combination a service gas meter, an inlet conduit having a disjointable coupling adjacent said service meter for supplying combustible gas to said service gas meter from a source of gas under pressure, an outlet conduit having a disjointable coupling adjacent said service gas meter for conveying said gas from said service meter to a point of use, the improvement comprising an enclosing bag disosed about said service meter and about said couplings and having a replacement meter therein, said bag forming a substantially fluid tight enclosure for said meters and said couplings, a normally closed purge port formed in a wall of said bag, and a pair of access sleeves secured to access openings formed in said bag for receiving the hands and arms of an operator disposed outside said bag whereby said couplings may be manually disconnected and said service meter may be manually lowered away from said couplings following opening of said purge port in such manner as to bleed gas into said bag and to purge air therefrom through said purge port without substantially reducing the flow of gas to said point of use and whereby said bag constitutes the sole conduit for the flow of gas between said couplings and thence to the point of use following closing of said purge port, said replacment meter being manually positioned and secured to said inlet and said outlet conduits via said couplings following full disconnection of said service meter.

4. The combination of claim 3 wherein said bag includes an opening for receiving said meters and wherein bracket means and associated gasket means are arranged to secure said bag in fluid tight relation about said inlet and said outlet conduits and whereby said opening is securely closed, and disjointable clamping means for holding said bracket means and said gasket means in bag closing condition.

5. The combination of claim 3 wherein a translucent window is formed in a wall of said bag.

6. Apparatus for disconnecting a fluid service gas meter supplied with fluid through a disjointable inlet conduit from a source of fluid under pressure and from which fluid is supplied through a disjointable outlet conduit to a point of use without substantially changing the rate of flow of fluid to said point of use, said apparatus comprising an enclosing element disposed about said service gas meter and having parts arranged in substantially fluid tight enveloping relation to said disjointable inlet and said disjointable outlet conduits so as to form a substantially fluid tight enclosure for said service gas meter and for said disjointable conduits, a normally closed purge port formed in a part of said enclosing element, at least one fluid tight access sleeve formed in said enclosing element for receiving a hand and arm of an operator disposed outside said enclosing element whereby said disjointable inlet and outlet conduits may be manually disconneced, and a pair of normally closed test conduits arranged to extend through the wall of said enclosing element in fluid tight relation therewith, said test conduits being adapted for interconnection with said fluid actuated device through said disjointable inlet and outlet conduits respectively following disconnection of said service gas meter and while said device is disposed within said enclosing element.

7. Apparatus according to claim 6 wherein said service gas meter comprises a gas meter and wherein said enclosing element comprises a bag formed of yieldable material which is substantially impervious to combustible gas.

8. Apparatus according to claim 6 wherein a translucent viewing window is formed in said enclosing element.

9. Apparatus according to claim 6 wherein a pair of fluid tight access sleeves are formed in said enclosing element.

10. Apparatus according to claim 6 wherein an opening is formed in said enclosing element through which said service gas meter is received into and removed from said enclosing element and wherein bracket means having yieldable gasket means is associated with said opening and arranged to grip the exterior surfaces of said inlet and said outlet conduits so as to form a fluid tight junction therebetween.

11. Apparatus according to claim 10 wherein said bracket means and the associated gasket means comprises a pair of rigid flanges to the outer surfaces of which opposite edges of said opening are secured respectively and with gaskets along the inner surfaces thereof and having straight mid portions and outwardly curved portions at the ends of said mid portions for enveloping said inlet and said outlet conduits respectively thereby to form said fluid tight junction.

12. Apparatus according to claim 11 wherein the ends of said rigid flanges are straight and wherein the adjacent parts of said enclosing element extend outwardly beyond the ends of said flanges, said ends of the adjacent parts of said enclosing element being folded outwardly and into overlying face contacting relation with the outer surface of one of said flanges.

13. Apparatus according to claim 12 wherein clamping means having clamping jaws is arranged to grip the ends of said flanges and the overlapping ends of the adjacent parts of said enclosing element to form a fluid tight junction therebetween.

14. Apparatus according to claim 13 wherein said clamping means is manually operable and comprises a pair of vise grips.

* * * * *